(12) United States Patent
Pederson et al.

(10) Patent No.: US 9,363,018 B2
(45) Date of Patent: *Jun. 7, 2016

(54) LED LIGHT INTERIOR ROOM AND BUILDING COMMUNICATION SYSTEM

(71) Applicant: Federal Law Enforcement Development Services, Inc., St. Cloud, MN (US)

(72) Inventors: John C. Pederson, St. Cloud, MN (US); Paul R. Brown, Lousiville, KY (US); Timothy J. Vogt, Elk River, MN (US); James LeClaire, Saint Paul Park, MN (US); James Zimmerman, Big Lake, MN (US); Brent Mikkelsen, Hartford, WI (US)

(73) Assignee: FEDERAL LAW ENFORCEMENT DEVELOPMENT SERVICES, INC., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,864

(22) Filed: Dec. 6, 2012

(65) Prior Publication Data
US 2013/0094863 A1    Apr. 18, 2013

Related U.S. Application Data

(63) Continuation of application No. 13/426,969, filed on Mar. 22, 2012, now Pat. No. 8,331,790, which is a continuation of application No. 12/126,647, filed on May 23, 2008, now abandoned.

(60) Provisional application No. 60/931,611, filed on May 24, 2007.

(51) Int. Cl.
  *H04B 10/00* (2013.01)
  *H04B 10/40* (2013.01)
  (Continued)

(52) U.S. Cl.
  CPC *H04B 10/40* (2013.01); *F21K 9/30* (2013.01); *G01S 1/70* (2013.01); *H04B 10/00* (2013.01);
  (Continued)

(58) Field of Classification Search
  CPC ............... H04B 10/00; H04B 10/1143; H04B 10/1149; H04W 8/085; H04W 4/18; H04W 76/02; H04W 64/00; H04W 84/12; H04W 88/00; H04W 88/08; H04W 92/20; H04W 12/08; H04W 28/12; H04W 28/20; H04W 48/02; H04W 48/20; H04W 4/04; H04W 64/006
  USPC .................................... 398/116, 96, 103, 118
  See application file for complete search history.

(56) References Cited

U.S. PATENT DOCUMENTS

| 700,678 A | 5/1902 | Downie |
| 2,082,279 A | 6/1937 | Fore |

(Continued)

FOREIGN PATENT DOCUMENTS

| AU | 2006201345 | 10/2007 |
| AU | 2007202909 | 2/2008 |

(Continued)

OTHER PUBLICATIONS

Akhavan et al., "High-Speed Power-Efficient Indoor Wireless Infrared Communication Using Code Combining-Part I," IEEE Trnsactions on Communications, vol. 50, No. 7, Jul. 2002, pp. 1098-1109.

(Continued)

*Primary Examiner* — Ken N Vanderpuye
*Assistant Examiner* — Abbas H Alagheband
(74) *Attorney, Agent, or Firm* — Vidas, Arrett & Steinkraus, P.A.

(57) ABSTRACT

An LED light and communication system in communication with a broadband over power line communications system. The LED light and communication system includes at least one optical transceiver. The optical transceiver includes a light support having a plurality of light emitting diodes and at least one photodetector attached thereto, and a processor. The processor is in communication with the light emitting diodes and the at least one photodetector. The processor is constructed and arranged to generate a communication signal. The at least one optical transceiver is engaged to a clock, and the clock is in communication with the broadband over power line communications system.

15 Claims, 4 Drawing Sheets

(51) Int. Cl.
*H04B 10/11* (2013.01)
*F21K 99/00* (2016.01)
*H04B 10/114* (2013.01)
*H04B 10/116* (2013.01)
*H05B 37/02* (2006.01)
*G01S 1/70* (2006.01)

(52) U.S. Cl.
CPC .............. *H04B 10/11* (2013.01); *H04B 10/116* (2013.01); *H04B 10/1143* (2013.01); *H04B 10/1149* (2013.01); *H05B 37/0272* (2013.01)

(56) References Cited

U.S. PATENT DOCUMENTS

| | | |
|---|---|---|
| 3,469,686 A | 9/1969 | Gutsche et al. |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A * | 10/1991 | Faulkner ................. H03M 7/00 341/107 |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,099,346 A * | 3/1992 | Lee ........................ H04B 10/40 398/1 |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | Van Dulmen |
| 5,247,380 A * | 9/1993 | Lee ........................ H04B 10/40 398/1 |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A * | 5/1994 | Choi ........................ G08B 5/38 315/200 A |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,566,022 A * | 10/1996 | Segev ..................... H04B 10/40 398/107 |
| 5,567,036 A | 10/1996 | Theobald |

(56) References Cited

U.S. PATENT DOCUMENTS

| | | | |
|---|---|---|---|
| 5,568,406 | A | 10/1996 | Gerber |
| 5,569,939 | A | 10/1996 | Choi |
| 5,575,459 | A | 11/1996 | Anderson |
| 5,580,156 | A | 12/1996 | Suzuki |
| 5,585,783 | A | 12/1996 | Hall |
| 5,593,223 | A | 1/1997 | Koizumi |
| 5,593,459 | A | 1/1997 | Gamblin |
| 5,594,415 | A | 1/1997 | Ishikawa |
| 5,598,290 | A | 1/1997 | Tanaka |
| 5,604,480 | A | 2/1997 | Lamparter |
| 5,606,444 | A | 2/1997 | Johnson |
| 5,607,788 | A | 3/1997 | Tomazic |
| 5,612,201 | A | 3/1997 | DePlaen |
| 5,612,231 | A | 3/1997 | Holm |
| 5,625,201 | A | 4/1997 | Holm |
| 5,627,851 | A | 5/1997 | Takahashi |
| 5,631,474 | A | 5/1997 | Saitoh |
| 5,632,551 | A | 5/1997 | Roney |
| 5,633,629 | A | 5/1997 | Hochstein |
| 5,634,287 | A | 6/1997 | Lamparter |
| 5,634,357 | A | 6/1997 | Nutter |
| 5,634,711 | A | 6/1997 | Kennedy |
| 5,635,902 | A | 6/1997 | Hochstein |
| 5,635,981 | A | 6/1997 | Ribacoff |
| 5,636,916 | A | 6/1997 | Sokolowski |
| 5,643,357 | A | 7/1997 | Breton |
| 5,644,291 | A | 7/1997 | Jozwik |
| 5,656,829 | A | 8/1997 | Sakaguchi |
| 5,660,461 | A | 8/1997 | Ignatius |
| 5,661,645 | A | 8/1997 | Hochstein |
| 5,661,742 | A | 8/1997 | Huang |
| 5,664,448 | A | 9/1997 | Swan |
| 5,674,000 | A | 10/1997 | Kalley |
| 5,694,112 | A | 12/1997 | VannRox |
| 5,696,500 | A | 12/1997 | Diem |
| 5,697,175 | A | 12/1997 | Schwartz |
| 5,705,047 | A | 1/1998 | Lee |
| 5,707,891 | A | 1/1998 | Izumi |
| 5,708,428 | A | 1/1998 | Phillips |
| 5,722,760 | A | 3/1998 | Chien |
| 5,726,535 | A | 3/1998 | Yan |
| 5,726,786 | A | 3/1998 | Heflinger |
| 5,734,337 | A | 3/1998 | Kupersmit |
| 5,734,343 | A | 3/1998 | Urbish |
| 5,736,925 | A | 4/1998 | Knauff |
| 5,739,552 | A | 4/1998 | Kimura |
| 5,739,592 | A | 4/1998 | Rigsby |
| 5,758,947 | A | 6/1998 | Glatt |
| 5,760,531 | A | 6/1998 | Pederson |
| 5,781,105 | A | 7/1998 | Bitar |
| 5,785,418 | A | 7/1998 | Hochstein |
| 5,786,918 | A | 7/1998 | Suzuki |
| 5,789,768 | A | 8/1998 | Lee et al. |
| 5,793,062 | A | 8/1998 | Kish, Jr. |
| 5,796,376 | A | 8/1998 | Banks |
| 5,804,822 | A | 9/1998 | Brass |
| 5,805,081 | A | 9/1998 | Fikacek |
| 5,805,209 | A | 9/1998 | Yuge |
| 5,806,965 | A | 9/1998 | Deese |
| 5,808,592 | A | 9/1998 | Mizutani |
| 5,809,161 | A | 9/1998 | Auty |
| 5,809,681 | A | 9/1998 | Miyamoto |
| 5,810,833 | A | 9/1998 | Brady |
| 5,818,421 | A | 10/1998 | Ogino |
| 5,826,965 | A | 10/1998 | Lyons |
| 5,828,055 | A | 10/1998 | Jebens |
| 5,831,155 | A | 11/1998 | Hewitt |
| 5,838,024 | A | 11/1998 | Masuda |
| 5,838,116 | A | 11/1998 | Katyl |
| 5,838,247 | A | 11/1998 | Bladowski |
| 5,838,259 | A | 11/1998 | Tonkin |
| 5,848,837 | A | 12/1998 | Gustafson |
| 5,860,135 | A | 1/1999 | Sugita |
| 5,872,646 | A | 2/1999 | Alderman |
| 5,875,261 | A | 2/1999 | Fitzpatrick |
| 5,884,997 | A | 3/1999 | Stanuch |
| 5,898,381 | A | 4/1999 | Gartner |
| 5,900,850 | A | 5/1999 | Bailey |
| 5,917,637 | A | 6/1999 | Ishikawa |
| 5,929,788 | A | 7/1999 | Vukosic |
| 5,931,562 | A | 8/1999 | Arato |
| 5,931,570 | A | 8/1999 | Yamuro |
| 5,932,860 | A | 8/1999 | Plesko |
| 5,934,694 | A | 8/1999 | Schugt |
| 5,936,417 | A | 8/1999 | Nagata |
| 5,939,996 | A | 8/1999 | Kniveton |
| 5,948,038 | A | 9/1999 | Daly |
| 5,959,752 | A | 9/1999 | Ota |
| 5,960,135 | A | 9/1999 | Ozawa |
| 5,965,879 | A | 10/1999 | Leviton |
| 5,966,073 | A | 10/1999 | Walton |
| 5,975,714 | A | 11/1999 | Vetorino |
| 5,990,802 | A | 11/1999 | Maskeny |
| 5,991,085 | A | 11/1999 | Rallison |
| 6,009,650 | A | 1/2000 | Lamparter |
| 6,014,237 | A | 1/2000 | Abeles |
| 6,018,899 | A | 2/2000 | Hanitz |
| 6,028,694 | A | 2/2000 | Schmidt |
| 6,035,053 | A | 3/2000 | Yoshioka |
| 6,035,055 | A | 3/2000 | Wang |
| 6,035,074 | A | 3/2000 | Fujimoto |
| 6,067,010 | A | 5/2000 | Wang |
| 6,067,011 | A | 5/2000 | Leslie |
| 6,067,018 | A | 5/2000 | Skelton |
| 6,072,893 | A | 6/2000 | Luo |
| 6,081,206 | A | 6/2000 | Kielland |
| 6,081,304 | A | 6/2000 | Kuriyama |
| 6,086,229 | A | 7/2000 | Pastrick |
| 6,091,025 | A | 7/2000 | Cotter |
| 6,094,148 | A | 7/2000 | Henry |
| 6,095,661 | A | 8/2000 | Lebens |
| 6,095,663 | A | 8/2000 | Pond |
| 6,102,696 | A | 8/2000 | Osterwalder |
| 6,106,137 | A | 8/2000 | Adams |
| 6,111,671 | A | 8/2000 | Bahuguna |
| 6,118,388 | A | 9/2000 | Morrison |
| 6,121,898 | A | 9/2000 | Moetteli |
| 6,126,087 | A | 10/2000 | Hedger |
| 6,159,005 | A | 12/2000 | Herold |
| 6,166,496 | A | 12/2000 | Lys |
| 6,177,678 | B1 | 1/2001 | Brass |
| 6,183,100 | B1 | 2/2001 | Suckow |
| 6,188,738 | B1 | 2/2001 | Sakamoto |
| 6,243,492 | B1 | 6/2001 | Kamei |
| 6,249,340 | B1 | 6/2001 | Jung |
| 6,268,788 | B1 | 7/2001 | Gray |
| 6,271,814 | B1 | 8/2001 | Kaoh |
| 6,271,815 | B1 | 8/2001 | Yang |
| 6,271,913 | B1 | 8/2001 | Jung |
| 6,292,575 | B1 | 9/2001 | Bortolussi |
| 6,293,904 | B1 | 9/2001 | Blazey |
| 6,318,886 | B1 | 11/2001 | Stopa |
| 6,352,358 | B1 | 3/2002 | Lieberman |
| 6,367,949 | B1 | 4/2002 | Pederson |
| 6,369,849 | B1 | 4/2002 | Rzyski |
| 6,377,558 | B1 | 4/2002 | Dent |
| 6,380,865 | B1 | 4/2002 | Pederson |
| 6,389,115 | B1 | 5/2002 | Swistock |
| 6,389,155 | B2 | 5/2002 | Funayama |
| 6,396,954 | B1 | 5/2002 | Kondo |
| 6,400,828 | B2 | 6/2002 | Covell |
| 6,411,022 | B1 | 6/2002 | Machida |
| 6,424,269 | B1 | 7/2002 | Pederson |
| 6,426,599 | B1 | 7/2002 | Leeb |
| 6,461,008 | B1 | 10/2002 | Pederson |
| 6,462,669 | B1 | 10/2002 | Pederson |
| 6,469,631 | B1 | 10/2002 | Pederson |
| 6,472,996 | B1 | 10/2002 | Pederson |
| 6,476,726 | B1 | 11/2002 | Pederson |
| 6,504,487 | B1 | 1/2003 | Pederson |
| 6,532,212 | B1 | 3/2003 | Soloway |
| 6,547,410 | B1 | 4/2003 | Pederson |
| 6,548,967 | B1* | 4/2003 | Dowling ............ G06Q 30/0201 315/307 |

(56) References Cited

U.S. PATENT DOCUMENTS

| | | |
|---|---|---|
| 6,590,343 B2 | 7/2003 | Pederson |
| 6,590,502 B1 | 7/2003 | Pederson |
| 6,600,274 B1 | 7/2003 | Hughes |
| 6,600,899 B1* | 7/2003 | Radomsky ......... H04B 10/1149 379/56.3 |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,819,654 B2 | 11/2004 | Soloway |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,006,768 B1 | 2/2006 | Franklin |
| 7,023,469 B1 | 4/2006 | Olson |
| 7,046,160 B2 | 5/2006 | Pederson |
| 7,102,665 B1 | 9/2006 | Chandler |
| 7,103,614 B1 | 9/2006 | Kucik |
| 7,183,895 B2 | 2/2007 | Bazakos |
| 7,230,884 B2* | 6/2007 | Shemesh ............... G04C 13/022 368/46 |
| 7,289,731 B2 | 10/2007 | Thinguldstad |
| 7,309,965 B2 | 12/2007 | Dowling |
| 7,323,991 B1* | 1/2008 | Eckert ................ G07C 9/00111 235/382 |
| 7,324,757 B2 | 1/2008 | Wilson |
| 7,352,972 B2 | 4/2008 | Franklin |
| 7,439,847 B2* | 10/2008 | Pederson ........... G07C 9/00158 340/5.81 |
| 7,529,488 B2* | 5/2009 | Burdick ................ G01M 11/00 398/137 |
| 7,548,698 B2 | 6/2009 | Yamamoto |
| 7,557,521 B2 | 7/2009 | Lys |
| 7,583,901 B2* | 9/2009 | Nakagawa ............... G09F 9/33 398/183 |
| 7,689,130 B2 | 3/2010 | Ashdown |
| 7,715,723 B2* | 5/2010 | Kagawa ............. H04B 10/1141 398/127 |
| 7,912,377 B2 | 3/2011 | Koga |
| 7,940,191 B2 | 5/2011 | Hierzer |
| 8,126,554 B2 | 2/2012 | Kane |
| 8,175,799 B1 | 5/2012 | Woehler |
| 8,188,878 B2 | 5/2012 | Pederson |
| 8,188,879 B2 | 5/2012 | Pederson |
| 8,207,821 B2* | 6/2012 | Roberge ................. F21K 9/00 340/9.11 |
| 8,421,588 B1 | 4/2013 | Ross |
| 8,538,692 B2 | 9/2013 | Wurman |
| 8,571,411 B2 | 10/2013 | Pederson |
| 8,593,299 B2 | 11/2013 | Pederson |
| 8,687,965 B2 | 4/2014 | Pederson |
| 8,729,833 B2 | 5/2014 | Chemel |
| 8,744,267 B2 | 6/2014 | Pederson |
| 8,886,045 B2 | 11/2014 | Pederson |
| 8,890,773 B1* | 11/2014 | Pederson ................ H04B 1/385 345/8 |
| 8,891,962 B2* | 11/2014 | Du .................... H04Q 11/0005 398/116 |
| 8,902,076 B2 | 12/2014 | Pederson |
| 2002/0109892 A1* | 8/2002 | Seto .................. H04B 10/278 398/182 |
| 2002/0168958 A1* | 11/2002 | Ford .................... H04W 76/007 455/404.1 |
| 2003/0025608 A1 | 2/2003 | Pederson |
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0212996 A1 | 11/2003 | Wolzien |
| 2003/0222587 A1* | 12/2003 | Dowling, Jr. ....... G06Q 30/0201 315/149 |
| 2004/0028349 A1 | 2/2004 | Nagasaka |
| 2004/0044709 A1 | 3/2004 | Cabrera |
| 2004/0101312 A1 | 5/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111533 A1* | 5/2005 | Berkman ................ H04B 3/542 375/220 |
| 2005/0111700 A1 | 5/2005 | O'Boyle |
| 2005/0169643 A1 | 8/2005 | Franklin |
| 2005/0231128 A1 | 10/2005 | Franklin |
| 2006/0039698 A1 | 2/2006 | Pautler |
| 2006/0056855 A1* | 3/2006 | Nakagawa ................ G09F 9/33 398/183 |
| 2006/0132382 A1 | 6/2006 | Jannard |
| 2006/0149813 A1* | 7/2006 | Janik .................... H04L 12/2898 709/203 |
| 2006/0192672 A1 | 8/2006 | Gidge |
| 2006/0193634 A1 | 8/2006 | Wang |
| 2006/0213731 A1 | 9/2006 | Lesesky |
| 2006/0238368 A1 | 10/2006 | Pederson |
| 2006/0275040 A1 | 12/2006 | Franklin |
| 2007/0041732 A1 | 2/2007 | Oki et al. |
| 2007/0104239 A1 | 5/2007 | Koga |
| 2007/0110446 A1 | 5/2007 | Hong |
| 2007/0145915 A1* | 6/2007 | Roberge ................. F21K 9/00 315/312 |
| 2007/0147843 A1 | 6/2007 | Fujiwara |
| 2007/0160373 A1 | 7/2007 | Biegelsen |
| 2007/0165244 A1 | 7/2007 | Yukhin |
| 2007/0195263 A1 | 8/2007 | Shimizu |
| 2007/0269219 A1 | 11/2007 | Teller |
| 2007/0294029 A1 | 12/2007 | D'Andrea |
| 2008/0044188 A1* | 2/2008 | Kagawa ............. H04B 10/1141 398/128 |
| 2008/0063404 A1 | 3/2008 | Broyde |
| 2008/0138077 A1 | 6/2008 | Stretton |
| 2008/0154101 A1* | 6/2008 | Jain ...................... A61B 5/0017 600/309 |
| 2008/0170536 A1* | 7/2008 | Marshack .......... H04B 7/18521 370/316 |
| 2008/0227463 A1 | 9/2008 | Hizume |
| 2008/0292320 A1 | 11/2008 | Pederson |
| 2009/0002265 A1 | 1/2009 | Kitaoka |
| 2009/0102396 A1 | 4/2009 | Petrucci |
| 2009/0129782 A1 | 5/2009 | Pederson |
| 2009/0157545 A1 | 6/2009 | Mobley |
| 2009/0262760 A1* | 10/2009 | Krupkin ................. G01S 7/414 372/6 |
| 2009/0315481 A1 | 12/2009 | Zhao |
| 2009/0315485 A1 | 12/2009 | Verfuerth |
| 2010/0111538 A1 | 5/2010 | Arita |
| 2010/0209105 A1 | 8/2010 | Shin |
| 2011/0006898 A1* | 1/2011 | Kruest ................. H01Q 1/2208 340/568.1 |
| 2012/0202520 A1 | 8/2012 | George |
| 2012/0230696 A1 | 9/2012 | Pederson |
| 2013/0221848 A1 | 8/2013 | Miesak |
| 2014/0153923 A1 | 6/2014 | Casaccia |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |

(56) References Cited

FOREIGN PATENT DOCUMENTS

| | | |
|---|---|---|
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1564914 | 8/2005 |
| FR | 2658024 | 8/1991 |
| FR | 2680861 | 3/1993 |
| FR | 2707222 | 1/1995 |
| FR | 1205763 A1 * 11/2000 ................ G01S 5/02 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 6333403 | 12/1994 |
| JP | 06333403 | 12/1994 |
| JP | 8002341 | 1/1996 |
| JP | 08002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 0225842 | 3/2002 |
| WO | 02073836 | 9/2002 |
| WO | 2007003037 | 11/2007 |

OTHER PUBLICATIONS

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efficiency Takes-off at Honolulu International Airport, Spring 2008, pp. 1-13.

Jeffrey B. Carruthers, "Wireless Infrared Communications," Wiley Encyclopedia of Telecommunications, 2002.

Kahn et al., "Wireless Infrared Communications," Proceedings of the IEEE, vol. 85, No. 2, Feb. 1997, pp. 265-298.

Komine T. et al., "Integrated System of White LED Visible-Light Communicaiton and Power-Line Communication," 20020915; 20020915-20020918, vol. 4, Sep. 15, 2002, pp. 1762-1766.

Pacific Northwest National Laboratory: Demonstration Assement of Light-Emitting Diode (LED) Parking Lot Lighting, Phase 1, Jun. 2010, pp. 1-37.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

T. Komine and M. Nakagawa, Integrated System of White LED Visible-Light Communication and Power-Line Communication Integrated System of White LED Visible-Light Communication and Power-Line Communication, Toshihiko Komine, Student Member, IEEE and Masao Nakagawa, Member, IEEE Date Feb. 1, 2003 pp. 71-79.

* cited by examiner

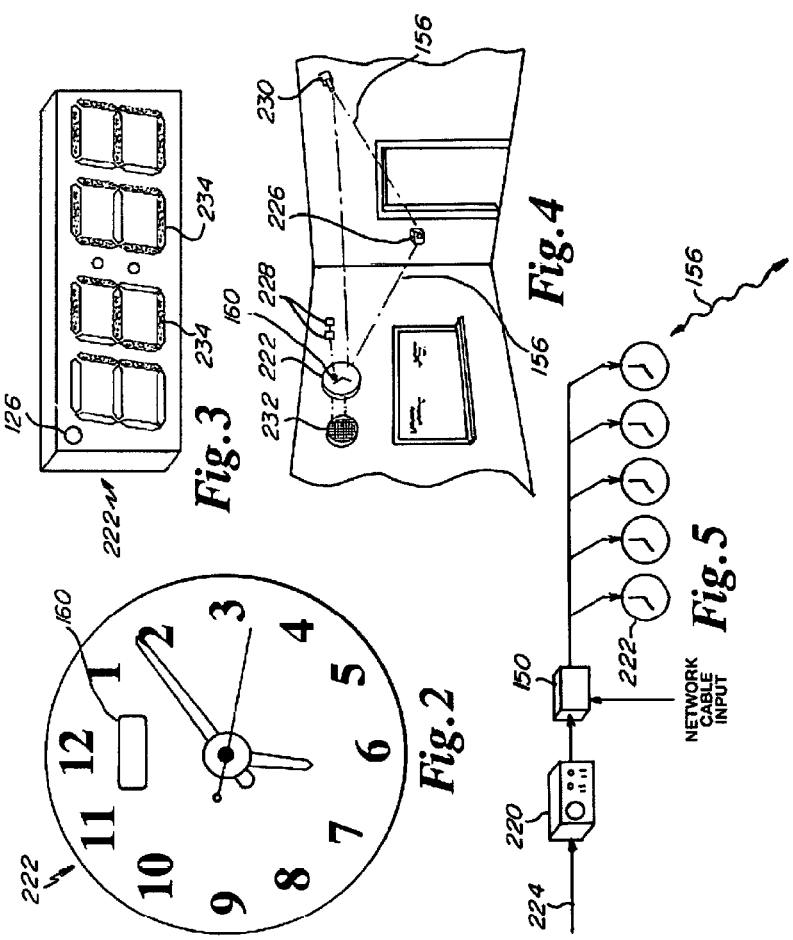

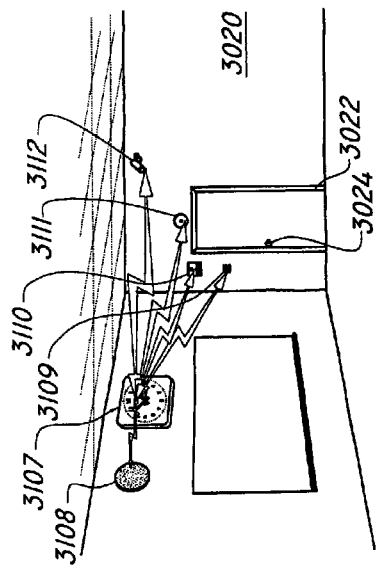
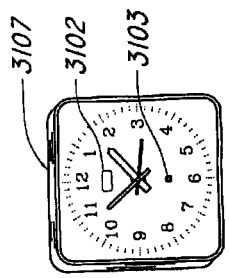
Fig. 6
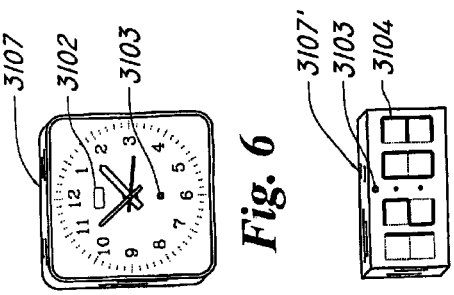
Fig. 7
Fig. 8
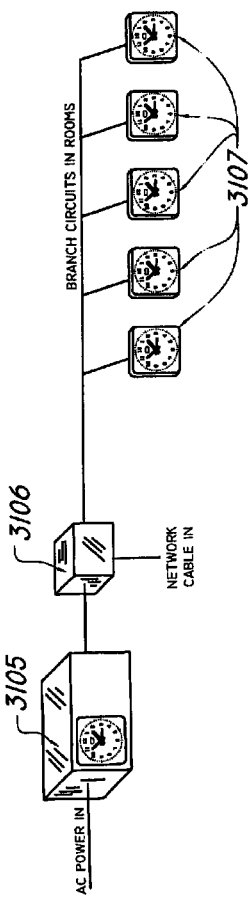
Fig. 9

LED LIGHT INTERIOR ROOM AND BUILDING COMMUNICATION SYSTEM

CROSS-REFERENCE TO RELATED APPLICATIONS

This application is a Continuation application from Ser. No. 13/426,969, filed Mar. 22, 2012, now issued as U.S. Pat. No. 8,331,790 which is a Continuation application from Ser. No. 12/126,647, filed May 23, 2008 which claims priority to provisional patent application No. 60/931,611, filed May 24, 2007, the disclosure of which is expressly incorporated herein by reference.

STATEMENT REGARDING FEDERALLY SPONSORED RESEARCH

Not Applicable

FIELD OF THE INVENTION

This invention pertains generally to the field of building communications, and more particularly to improve communications apparatus providing enhanced electrical communications signaling and control systems using existing infrastructure.

BACKGROUND OF THE INVENTION

Present communication techniques using wireless communication including radiofrequency transmissions raise security concerns because transmissions using RF can be easily intercepted, in part because of the fact that RF signals are designed to radiate signals in all directions. Second, radio frequency transmissions may be regulated by the Federal Communications Commission (FCC) which may control the frequencies that may be used for RF transmission. Third, RF by its very nature is susceptible to interference and produces noise.

In contrast to RF communications, light sources used for communication are extremely secure due to the fact that they are focused within a narrow beam, requiring placing equipment within the beam itself for interception. Also, because the visible spectrum is not regulated by the FCC, light sources can be used for communications purposes without the need of a license. And, light sources are not susceptible to interference nor do they produce noise that can interfere with other devices.

Light emitting diodes (LEDs) can be used as light sources for data transmission, as described in U.S. Pat. Nos. 6,879, 263 and 7,046,160, the entire contents of each being expressly incorporated herein by reference. LEDs have many advantages over conventional light sources, such as incandescent and fluorescent lighting, for example. One important advantage is their quick response to "ON" and "OFF" signals, as compared to the longer warm-up and response times associated with fluorescent lighting, for example. Another important advantage is their efficiency in producing light, as measured in lumens per watt. Recent developments in LED technology, such as high brightness blue LEDs, which in turn paved the way for white LEDs, have made LEDs a practical alternative to conventional light sources. As such, LED technology provides a practical opportunity to combine lighting and communication. This combination of lighting and communication allows ubiquitous light sources such as street lights, home lighting, and office building lighting, for example, to be converted to, or supplemented with, LED technology to provide for communications while simultaneously producing light for illumination purposes.

Regarding office buildings, building management is a complex science which incorporates and governs all facets of human, mechanical and structural systems associated with buildings. As a result of the complexity, most commercial buildings are managed by commercial property management companies with great expertise. Both at the time of construction and throughout the life-cycle of a building, the interrelationships between people and the mechanical and structural systems are most desirably evaluated. Where possible and cost-effective, human interactions with a building and associated mechanical systems will be optimized, in turn providing the greatest benefit to both the owners and those who use the facilities afforded by the building. Noteworthy is the fact that building users may include both regular occupants such as individual or commercial tenants, and also transient occupants such as visitors, guests, or commercial customers.

Building management includes diverse facets, some which are simply representations of the building and associated systems and people, and other facets which are tangible. Exemplary of representations are accounting or financial monitoring responsibilities which will including record keeping control and assurance of financial transactions involving tenants, owners, and service providers. Exemplary of the physical or tangible responsibilities are physical development and maintenance, including identification of need for features, improvements, maintenance and the assurance of the execution of the same. As is well understood by those highly versed in building management, the diverse responsibilities and extent of information required to manage a building is often quite overwhelming.

One very important area associated with building management is lighting or illumination. While often perceived as a simple task of providing lights, this seemingly simple task has much research and science behind a well-designed lighting system. This is because safety, productivity and general well-being of occupants depend heavily on proper lighting.

Many factors need considered at the time of construction or remodeling to facilitate proper lighting design. Intended usage of a space is important in illumination design consideration, since this will dictate necessary illumination levels, times and duration of use, and anticipated cycling of the illumination. In other words, a supply closet will not ordinarily be designed for around-the-clock illumination, and may instead by configured to operate on a switch, or alternatively a motion detector with relatively short-delay turn-off when no motion is detected. The use of appropriate switches and motion detectors helps to reduce the energy required for a building to function with occupants, and simultaneously increases the life of many illumination components such as light sources (light bulbs and equivalents thereto) since the light sources are only required intermittently. As another example, a room where movies, slides, computer or other visual or audio-visual presentations are given, such as a boardroom or classroom, will preferably have light controls such as separate switches or switches and dimmer controls which enable the entire room to be well lit or alternatively maintain a minimum level of illumination normally opposite to where the presentation is displayed. This minimum level of illumination enables occupants sufficient light for note-taking, safe movement and other important activities, without interfering with the legibility of a presentation. In yet another example, a primary workspace such as a desk or kitchen counter will require illumination that does not cast shadows on the work space while work is being performed. Complementary illumination, such as windows or skylights, is also important in design consideration.

Nearly all public buildings rely on a great many lamps positioned throughout the interior of the building, such as along hall corridors and in each room, and also about the exterior. These lights have historically been activated manually, though more recently a small but growing number are activated according to occupancy, proximity or motion sensors, typically incorporating the well-known Infra-Red (IR) motion sensors. Architects are commonly employed to assist not only with a floor plan of physical spaces, but also with the proper selection and layout of lighting to best complement the floor plan and usage of each space within a building. As may be appreciated, illumination of a space is determined at the time of production of blueprints, in anticipation of construction. The illumination that has been chosen for a space is essentially fixed during building construction. Changes may be made later, but not without substantial additional expense that will, for exemplary purposes, often include removal of parts of or entire walls, with the accompanying disruption of the space. Often the space is unavailable for use during the entire duration of a remodeling project.

Further complicating the issue of illumination is the type of light bulb that may be most appropriate for a space or location. Original electric light bulbs were incandescent. With sufficient electrical energy, which is converted to heat within an incandescent bulb filament, the filament will emit visible light. This is similar to a fire, where with enough heat, visible light is produced. As might also be appreciated though, incandescent bulbs produce far more heat than light. The color of the light from these bulbs is also most commonly quite yellow, casting a warm hue at a color temperature typically in the vicinity of 3,000 degrees Kelvin. Warm hues are often prized in relaxed settings such as those of a living room or dining room, more closely resembling gentle candle light. However, in contrast thereto, work and study environments are more preferably illuminated with light of more blue content, more closely resembling daylight with color temperatures of approximately 6,000 degrees Kelvin. Daylight color temperatures are not practically obtained using an incandescent bulb. In addition, these incandescent bulbs have only a few thousand hour life expectancy, even with more than a century of improvements, because the extreme temperatures required for the filament to light also gradually evaporates the filament material. Finally, the thermal mass of the filament greatly influences how quickly the filament both illuminates and extinguishes. In spite of the many limitations, incandescent bulbs are still in fairly wide-spread use today.

An alternative to incandescent light bulbs in common use today is the fluorescent bulb. A fluorescent light bulb uses a small amount of mercury in vapor state. High voltage electricity is applied to the mercury gas, causing the gas to ionize and generate some visible light, but primarily UltraViolet (UV) light. UV light is harmful to humans, being the component that causes sun burns, so the UV component of the light must be converted into visible light. The inside of a fluorescent tube is coated with a phosphorescent material, which when exposed to ultraviolet light glows in the visible spectrum. This is similar to many glow-in-the-dark toys and other devices that incorporate phosphorescent materials. As a result, the illumination from a fluorescent light will continue for a significant time, even after electrical power is discontinued, which for the purposes of the present disclosure will be understood to be the latent period or latency between the change in power status and response by the phosphor. As the efficiencies and brightness of the phosphors has improved, so in many instances have the delays in illumination and extinguishing, or latency, increased. Through the selection of ones of many different modern phosphorescent coatings at the time of manufacture, fluorescent bulbs may manufactured that produce light from different parts of the spectrum, resulting in manufacturing control of the color temperature, or hue or warmness of a bulb.

The use of fluorescent bulbs, even though quite widespread, is controversial for several reasons. One source states that all pre-1979 light ballasts emit highly toxic Polychlorinated BiPhenyls (PCBs). Even if modern ballasts are used, fluorescent bulbs also contain a small but finite amount of mercury. Even very small amounts of mercury are sufficient to contaminate a property. Consequently, both the manufacture and disposal of mercury-containing fluorescent tubes is hazardous. Fluorescent lighting has also been alleged to cause chemical reactions in the brain and body that produce fatigue, depression, immuno-suppression, and reduced metabolism. Further, while the phosphor materials may be selected to provide hue or color control, this hue is fixed at the time of manufacture, and so is not easily changed to meet changing or differing needs for a given building space.

Other gaseous discharge bulbs such as halide, mercury or sodium vapor lamps have also been devised. Halide, mercury and sodium vapor lamps operate at higher temperatures and pressures, and so present undesirably greater fire hazards. In addition, these bulbs present a possibility of exposure to harmful radiation from undetected ruptured outer bulbs. Furthermore, mercury and sodium vapor lamps generally have very poor color-rendition-indices, meaning the light rendered by these bulbs is quite different from ordinary daylight, distorting human color perception. Yet another set of disadvantages has to do with the starting or lighting of these types of bulbs. Mercury and sodium vapor lamps both exhibit extremely slow starting times, often measured by many minutes. The in-rush currents during starting are also commonly large. Many of the prior art bulbs additionally produce significant and detrimental noise pollution, commonly in the form of a hum or buzz at the frequency of the power line alternating current. In some cases, such as fluorescent lights, ballasts change dimension due to magnetostrictive forces. Magnetic field leakage from the ballast may undesirably couple to adjacent conductive or ferromagnetic materials, resulting in magnetic forces as well. Both types of forces will generate undesirable sound. Additionally, in some cases a less-optimal bulb may also produce a buzzing sound.

When common light bulbs are incorporated into public and private facilities, the limitations of prior art bulb technologies often will adversely impact building occupants. As just one example, in one school the use of full-spectrum lamps in eight experimental classrooms decreased anxiety, depression, and inattention in students with SAD (Seasonal Affective Disorder). The connection between lighting and learning has been conclusively established by numerous additional studies. Mark Schneider, with the National Clearinghouse for Educational Facilities, declares that ability to perform requires "clean air, good light, and a quiet, comfortable, and safe learning environment." Unfortunately, the flaws in much of the existing lighting have been made worse as buildings have become bigger. The foregoing references to schools will be understood to be generally applicable to commercial and manufacturing environments as well, making even the selection of types of lights and color-rendition-indexes very important, again depending upon the intended use for a space. Once again, this selection will be fixed, either at the time of construction when a particular lighting fixture is installed, or at the time of bulb installation, either in a new fixture or with bulb replacements.

A second very important area associated with building management is energy management. The concern for energy management is driven by the expense associated with energy consumed over the life of a building. Energy management is quite challenging to design into a building, because many human variables come into play within different areas within a building structure. Considering the foregoing discussion of lighting, different occupants will have different preferences and habits. Some occupants may regularly forget to turn off lights when a space is no longer being occupied, thereby wasting electricity and diminishing the useful life of the light bulbs. In another instance, one occupant may require full illumination for that occupant to operate efficiently or safely within a space, while a second occupant might only require a small amount or local area of illumination. Further complicating the matter of energy management is the fact that many commercial establishments may have rates based upon peak usage. A business with a large number of lights that are controlled with a common switch may have peak demands large relative to total consumption of power, simply due to the relatively large amount of power that will rush in to the circuit. Breaking the circuit into several switches may not adequately address inrush current, since a user may switch more than one switch at a time, such as by sliding a hand across several switches at once. Additionally, during momentary or short-term power outages, the start-up of electrical devices by the power company is known to cause many problems, sometimes harming either customer equipment or power company devices. Control over inrush current is therefore very desirable, and not economically viable in the prior art.

Energy management also includes consideration for differences in temperature preferred by different occupants or for different activities. For exemplary purposes, an occupant of a first office space within a building may prefer a temperature close to 68 degrees Fahrenheit, while a different occupant in a second office space may prefer a temperature close to 78 degrees Fahrenheit. The first and second office spaces may even be the same office space, just at different times of day. For exemplary purposes, an employee working in a mail room from 8 a.m. until 4 p.m. may be replaced by a different mail room employee who works from 4 p.m. until 12 a.m. Heating, Ventilation, and Air Conditioning (HVAC) demand or need is dependent not only upon the desired temperature for a particular occupant, but also upon the number of occupants within a relatively limited space. In other words, a small room with many people will require more ventilation and less heating than that same room with only one occupant.

With careful facility design, considerable electrical and thermal energy can be saved. Proper management of electrical resources affects every industry, including both tenants and building owners. In the prior art, this facility design has been limited to selection of very simple or basic switches, motion detectors, and thermostats, and particular lights, all fixed at the time of design, construction or installation.

A third very important area associated with building management is security. Continuing to use a school as but one example of a public building, a one-room country school fifty years ago was made up of one teacher who knew well the small number of pupils. Security consisted of a simple padlock on a wooden door. The several windows on one side of the room provided light. They were locked but almost never broken into, for nothing of major value, even during the Depression, enticed potential thieves.

Architecture changed as the years passed. Buildings were enlarged as school populations increased. Students started to conceal books, outerwear, valuables, and occasionally even weapons in enclosed lockers. Indoor lighting was required. Eventually as society became more hazardous, security had to be provided in many schools in the form of personnel who were required to patrol both outside and inside schools in order to provide a measure of safety.

In many public buildings, including schools, modern security presently screens a building's occupants to ensure that they belong or have proper authorization to enter the building. Security must also check for weapons, drugs, and even explosives. Thus, modern security personnel are often responsible for property as well as people. As the types of potential perils increase, so does the need for personnel, to process occupants through more and more stations. For exemplary purposes, in schools, airports, court houses, and other public facilities, one or more guards may check identification, admission badges or paperwork, while one or more other guards monitor metal detectors. One or more additional guards may be monitoring drug sniffing dogs or equipment, or spot checking bags. Unfortunately, the possibilities of duplication and/or forgery of credentials, or of hostile powers infiltrating security, or other criminal methods demonstrate the potential weaknesses of the present system, which depends upon a large number of security employees. Motion sensors and other prior art electronic security measures, while often beneficial, occasionally fail even when used in combination with security personnel to provide adequate protection. On the outside of a building, motion sensors may be activated by strong winds, stray animals, passing vehicles, or blowing debris. Inside, they operate only for a specific time; a room's occupant, if not moving about, may suddenly be in the dark and must re-activate the light by waving or flailing about.

An increasingly complex, and therefore hazardous, society requires increasingly extensive patrols and safeguards. Current security system, which must rely on increasing the numbers of guards and security devices, are subject to inherent defects and extraordinary expense, generally rendering them inadequate even with the best of intention.

Yet another very important area associated with building management is guidance control and indication, which impacts building security, as well as building convenience and efficiency for occupants. In buildings having many alternative hallways or paths, such as are commonly found in hospitals and other large public facilities, directions are often clumsy and difficult for visitors or emergency personnel to follow. Old-fashioned directories may be hard to locate or decipher, especially for non-English speakers or for persons with little or no time, again such as emergency personnel. Consequently, some buildings provide color stripes along walls that serve as color coding to guide visitors to various areas within the building. Unfortunately, the number of color stripes that may be patterned is quite limited, and the expense and defacing of appearance associated therewith is undesirable. Furthermore, such striping does not completely alleviate confusion, and the color stripes can only serve as general guides to commonly visited areas.

In addition to their numerous uses with building management, LEDs can be used in networking applications. In any network, a variety of client devices will communicate with one or more host devices. The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The host may further provide access to the Internet.

A variety of client devices have heretofore been enabled to connect to host devices. Such client devices may commonly include computing devices of all sorts, ranging from hand-held devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth. Essentially, any device which incorporates or can be made to incorporate sufficient electronic circuitry may be so linked as a client to a host.

Existing client devices are designed to connect to host network access points through wired connections, like copper wire, for example, fiber optic connections, or as wireless connections, such as wireless routers. In the case of a wired system, whether through simple wire, twisted wire, co-axial cable, fiber optics or other line or link, the host and client are tethered together through this physical communications channel. The tether, as may be appreciated, limits movement of the client relative to the host, is often unsightly and hard to contain in a workspace, and so may even be or become a tripping hazard. In addition, electrical connectors such as jacks must be provided, and these connectors necessarily limit the number of access points and locations. The installation of connectors defaces walls, sometimes rendering them unsuitable for a particular desired application, and yet they add undesirable installation expense, whether during new construction or in retrofitting an existing building structure.

In contrast, in the case of wireless routers, an RF signal replaces the physical communications channel with a radio channel. This advantageously eliminates the wire or fiber tether between client and host. Instead, client devices in a wireless system try through various broadcasts and signal receptions to find an access point that will have adequate transmission and reception, generally within a certain signal range which may range from a few meters to as many as several tens of meters. The systems are programmed to bridge from a host access point to various client devices through known exchanges of information, commonly described as communications protocols or handshakes. Depending upon the communications channel, a variety of client connection devices are utilized such as PCMCIA or PC cards, serial ports, parallel ports, SIMM cards, USB connectors, Ethernet cards or connectors, firewire interfaces, Bluetooth compatible devices, infrared/IrDA devices, and other known or similar components.

The security of these prior art wireless devices can be compromised in that they are vulnerable to unauthorized access or interception, and the interception may be from a significant distance, extending often well beyond physical building and property boundaries. Moreover, reliability can be hindered by interference from an appliance such as a microwave oven.

Buildings can encompass a very large number of rooms or discrete spaces, each functioning relatively independently from each other. Where the rooms or discrete spaces together form a larger entity such as a business, public institution or facility, or the like, which have attempted to include synchronized time keeping throughout the entity. A large number of buildings, both public and private, have synchronized clocks installed therein.

These same buildings also have a number of additional features including, for exemplary purposes though not limited thereto, fire and smoke detection, temperature control, and public address. Because of the ever-changing nature of a building and the best practices associated therewith, it can be quite difficult if not impossible to keep all areas within a building up to date with best practices or preferred capabilities. One method of desirable features or capabilities within a building space is through the use of electrical wiring adequate to accommodate the features or capabilities, particularly when the features or capabilities are identified subsequent to original construction.

For exemplary purposes, a building may accommodate very different numbers of occupants at different times within a relatively enclosed space, such as a meeting or class room. The number of occupants is known to significantly alter the temperature and associated need for HVAC control. Furthermore, other factors, such as weather conditions and sunlight or lack thereof through windows in a room may have as much or greater effect on the need for HVAC control. However, many older buildings were only provided with a single central thermostat, providing the same amount of heating or air conditioning to a room or other space regardless of demand for the same. Newer HVAC systems enable control, through electrically controlled dampers or vents within the HVAC system to much more precisely respond to the needs of a single space or room within a building. However, without providing wiring within the room to accommodate the thermostat and various duct controls, the room may not be individually controlled.

Even where a building is originally provided with appropriate wiring for each electrical system or component desired, necessary remodeling may critically alter the need. As one example, consider when a room or space is subdivided into two smaller spaces. Existing wiring only provides for electrical connection to one set of devices for one room. In this case, it may be necessary to run new wires back to one or more central locations, utility rooms, or the like to accommodate the new room and devices within the room.

More buildings are incorporating wireless networks within the building, the networks which are intended to reduce the need for wiring alterations and additions practiced heretofore. However, these wireless networks are not contained within the walls of a building, and so they are subject to a number of limitations. One of these is the lack of specific localization of a signal and device. For exemplary purposes, even a weak Radio-Frequency (RF) transceiver, in order to communicate reliably with all devices within a room, will have a signal pattern that will undoubtedly cross into adjacent rooms. If only one room or space in a building is to be covered, this signal overlap is without consequence. However, when many rooms are to be covered by different transceivers, signal overlap between transceivers requires more complex communications systems, including incorporating techniques such as access control and device selection based upon identification. Since the radio signal is invisible, detection of radiant pattern and signal strength are difficult and require special instruments. Further, detection of interference is quite difficult. Finally, such systems are subject to outside tapping and corruption, since containment of the signal is practically impossible for most buildings.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. §1.72.

GENERAL DESCRIPTION OF THE INVENTION

According to the invention, there is provided a light emitting diode (LED) signal light and systematic information transfer through encrypted pulsed light (hereinafter SIT-TEL) communication system which may be depicted in several embodiments. Any reference to a SIT-TEL communication herein is perceived to be equivalent to, and/or the same as, a general reference to pulsed light communication. In general, the signal light and SIT-TEL pulsed light communication system may be formed of a single row, single source, or an array of light emitting diode light sources configured on a light support and in electrical communication with a controller and a power supply, battery, or other electrical source. The signal light and SIT-TEL pulsed light communication system may provide various light signals, colored light signals, or combination or patterns of light signals for use in association with the communication of information. These light signals may also be encoded. Additionally, the signal light and SIT-TEL pulsed light communication system may be capable of displaying symbols, characters, or arrows. Rotating and oscillating light signals may be produced by sequentially illuminating columns of LEDs on a stationary light support in combination with the provision of variable light intensity from the controller. However, the signal light and SIT-TEL pulsed light communication system may also be rotated or oscillated via mechanical means. The signal light and SIT-TEL pulsed light communication system may also be easily transportable and may be conveniently connected to a stand such as a tripod for electrical coupling to a power supply, battery, or other electrical source as a remote stand-alone signaling or communication device.

The signal light and SIT-TEL pulsed light communication system may be electrically coupled to a controller used to modulate, pulse, or encode, the light generated from the light sources to provide for various patterns or types of illumination to transmit messages.

Individual light supports as a portion of the SIT-TEL communication system may be positioned adjacent to, and/or be in electrical communication with another light support, through the use of suitable electrical connections. Alternatively, individual light supports may be in communication with each other exclusively through the transmission and receipt of pulsed light signals.

A plurality of light supports or solitary light sources may be electrically coupled in either a parallel or series manner to a controller. The controller is also preferably in electrical communication with the power supply and the LEDs, to regulate or modulate the light intensity for the LED light sources. The individual LEDs and/or arrays of LEDs may be used for transmission of communication packets formed of light signals.

The controller for the LED light support may generate and/or recognize pulsed light signals used to communicate information. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light carrier.

Some embodiments of the present invention utilize an existing master clock that regulates or synchronizes additional slave clocks within a building. Because all of the clocks in the system operate on a dedicated network, the master clock is already connected to all of the rooms or spaces within the building having slave clocks. The present invention couples through the synchronization wire to each room or space. Communications are achieved that connect all rooms in a building that have these master and slave clocks, without changing wiring. Also since these synchronized clocks have dedicated electrical wiring for the synchronization signal that is separated from the AC power wiring, the synchronization wire is not subject to such severe interference as might be found on the building's AC power wiring.

In some embodiments of the present invention a clock with an optical transceiver delivers network access by way of LED transceivers. Since in many buildings clock systems with synchronization wiring is already in place, there is no need to install additional expensive and inconvenient wiring.

In some embodiments of the present invention a clock with an optical transceiver is integrated into systems, such as security, safety, HVAC and other diverse functions. In some embodiments of the present invention a clock with an optical transceiver provides for several types of communications with a room and electrical devices therein, including audible, visual and optical LED communications. In some embodiments of the present invention a clock with an optical transceiver improves security, because light does not go through walls, in contrast to radio communications, and steps can be taken to obstruct visible transmissions with a much greater certainty than with radio waves. In some embodiments of the present invention a clock with an optical transceiver limits or directs visible light by known optical components such as lenses and reflectors to selectively narrow the radiant transmission energy, as opposed to omni-directional transmissions. In some embodiments of the present invention a clock with an optical transceiver reduces interference with existing communication systems like those that are common today. In some embodiments of the present invention a clock with an optical transceiver facilitates and simplifies set-up, testing, troubleshooting and the like with respect to various facility systems. In some embodiments of the present invention a clock with an optical transceiver generates relatively high energy outputs using the preferred visible light communications channel, since the human eye is adapted and well-protected against damage from visible light. In contrast, many invisible transmission techniques such as Ultraviolet (UV) or Infra-Red (IR) systems have much potential for harm.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 2 is a front view of an alternative embodiment of the Communication System.

FIG. 3 is a front view of an alternative embodiment of the Communication System.

FIG. 4 is an environmental view of an alternative embodiment of the Communication System.

FIG. 5 is an environmental and block diagram view of an alternative embodiment of the Communication System.

FIG. 6 illustrates by isometric projected view a first embodiment of a slave clock combined with optical transmitter and receiver in accord with the teachings of the present invention.

FIG. 7 illustrates by isometric projected view a second embodiment of a slave clock combined with optical transmitter and receiver in accord with the teachings of the present invention.

FIG. 8 illustrates by front environmental view an embodiment of a building communication and management system within one room or space, using a single slave clock to communicate with a variety of diverse devices through optical LED communication channels.

FIG. 9 illustrates by projected environmental view an embodiment of a communications network incorporating master and slave synchronized clocks.

DETAILED DESCRIPTION OF THE PREFERRED EMBODIMENTS

Figure 1:
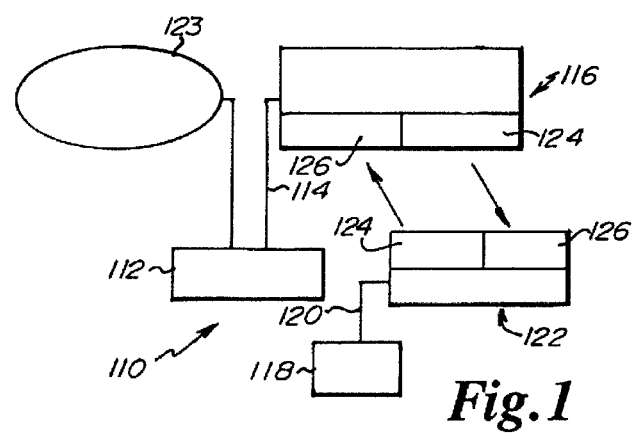
FIG. 1 is a block diagram of one embodiment of the Communication System.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In each of the embodiments discussed below, the LEDs may be formed of the same or different colors. The controller may be configured to select the color of the LEDs to be illuminated forming the light signal.

This application is related to the patent application entitled "LED Light Communication System," U.S. patent application Ser. No. 12/126,529, filed May 23, 2008, now issued as U.S. Pat. No. 8,188,878 which is incorporated by reference herein in its entirety. The present application is also related to the patent application entitled "LED Light Dongle Communication System," U.S. patent application Ser. No. 12/126,227, filed May 23, 2008, now issued as U.S. Pat. No. 8,687,965 which is incorporated herein by reference in its entirety. Also the present application is related to the patent application entitled "Building Illumination Apparatus With Integrated Communications, Security and Energy Management," U.S. patent application Ser. No. 12/126,342, filed May 23, 2008, which is incorporated by reference herein it its entirety.

Further the present application is also related to the patent application entitled "Led Light Broad Band Over Power Line Communication System," U.S. patent application Ser. No. 12/126,469, filed May 23, 2008, which is incorporated by reference herein in its entirety. The present application is also related to the patent application entitled "Led Light Global Positioning And Routing Communication System," U.S. patent application Ser. No. 12/126,589, filed May 23, 2008, now issued as U.S. Pat. No. 8,188,879 which is incorporated by reference in its entirety.

Applicant incorporates by reference herein patent application Ser. No. 10/646,853, filed Aug. 22, 2003, which claims the benefit of provisional patent application Nos. 60/405,592 and 60/405,379, both filed Aug. 23, 2002, the disclosures of all three being expressly incorporated herein by reference. Applicant also incorporates by reference herein patent application Ser. No. 12/032,908, filed Feb. 18, 2008, which is continuation of patent application Ser. No. 11/433,979, filed May 15, 2006, which is a continuation of patent application Ser. No. 11/102,989, filed Apr. 11, 2005, now issued U.S. Pat. No. 7,046,160, which is a division of patent application Ser. No. 09/993,040, filed Nov. 14, 2001, now issued U.S. Pat. No. 6,879,263, which claims the benefit of provisional patent application No. 60/248,894, filed Nov. 15, 2000, the entire contents of each being expressly incorporated herein by reference.

FIG. 1 depicts an exemplary embodiment 110 of an LED light and communication system. FIG. 1 shows a server PC 112 connected via a USB cable 114 to a server optical transceiver (XCVR) 116, and a client PC 118 connected via a USB cable 120 to a client optical transceiver 122. The server PC 112 is in communication with a network 123 via a CAT-5 cable, for example. The server optical XCVR and the client optical XCVR are substantially similar in at least one embodiment. An exemplary optical XCVR (or, simply, "XCVR") circuit includes one or more LEDs 124 for transmission of light and one or more photodetectors 126 for receiving transmitted light. LEDs and photodetectors are well known to those of ordinary skill in the art and, as such, their specific operation will not be described in detail. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In some embodiments, a 9V battery can be used to power the amplifier circuitry. Significant noise is generated by switching high brightness LEDs on and off at 200 mA and 500 kbps, for example. Powering the amplifier with a battery can reduce these noise problems by reducing or removing transients.

It should be noted that in some embodiments, the LED can both emit and receive light. In such an embodiment, the LED can act both as a transmitter or receiver. More information on such bi-directional LEDs can be found in U.S. Pat. No. 7,072,587, the entire contents of which are expressly incorporated herein by reference.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, or any other digital modulation technique known by those of ordinary skill. Similarly, such XCVRs can include demodulation circuitry that extracts the data from the received signal. Modulation and demodulation techniques for modulating light signals are known by those of ordinary skill in the art. Examples of such techniques are described in U.S. Pat. Nos. 4,732,310, 5,245,681, and 6,137,613, the entire contents of each being expressly incorporated herein by reference.

It may be desirable in some embodiments to further include filters or filter circuitry to prevent unwanted light from being amplified. For example, the optical baseband signal can be modulated at 100 kHz and then transmitted. The XCVR that receives the 100 kHz modulated signal can include a filter stage centered at 100 kHz. The filtered 100 kHz signal can then be input into the amplifier circuitry, thereby preventing amplification of unwanted signals. In some embodiments, it can be desirable to amplify the transmitted signal first, and then filter out the baseband signal.

Additional information regarding data communication can be found in International Publication Number WO 99/49435, the entire contents of which are expressly incorporated herein by reference.

In another embodiment of the present invention, security badges, ID badges, communications badge, badge, user interface device, or name tags, these terms being used interchangeably hereafter, can include optical XCVRs. The optical XCVR of a user's security badge communicates with the optical XCVRs that are also acting as room lighting, hall lighting, clock or other lighting in a customer's facility. Of course, the optical XCVRs can be placed in numerous other locations as lighting sources. Using the XCVRs as light sources can reduce energy consumption and simplify communications by reducing the filtering or modulation complexities necessary to distinguish data signals from extraneous lighting sources.

In accord with a preferred method of the invention, LEDs are used to transmit through optical communication channel several kinds of data, including identity, location, audio and video information. The use of an optical communications link provides large available bandwidth, which in turn permits multiple feeds of personal communication between LED light sources and badges similar to or in excess of that of cell phones. The optical data is transferred at rates far in excess of those detectable by the human eye, and so a person is not able to detect any visible changes as the data is being transferred. Additionally, because optical illumination is constrained by opaque objects such as walls, the location of a badge and associated person can be discerned to a particular room, hallway or other similar space.

In such an embodiment, the user can use the name tag as a communication device. Alternatively, the user may use the name tag to stream music, or video if a display is included. Furthermore, the optical XCVR can also include non-volatile memory (FLASHRAM, EEPROM, and EPROM, for example) that can store firmware for the optical XCVR, as well as text information, audio signals, video signals, contact information for other users, etc., as is common with current cell phones. While a hard-drive may be used instead of these semiconductor-based memory devices, hard-drives may be impractical in some embodiments based on their size, access times, as well as their susceptibility to jarring.

There are numerous applications of such a design. For example, in some embodiments, an optical XCVR is engaged to a door lock. When a user with a name tag approaches a locked door, the name tag broadcasts the unique code, and an optical XCVR in communication with the door lock receives the code, and if acceptable, unlocks or opens the door. A table of acceptable codes may be stored in a memory device that is in communication with, and accessible by, the door's optical XCVR. Alternatively, the door's optical XCVR may transmit a code to a central station that compares the user's code against a table of approved codes and then sends a response either allowing or denying access.

The present invention reduces the extent of human interaction required to control various functions such as light switches and thermostats, while simultaneously increasing the capabilities of such controls. Individual or selected groups of lights may be selectively configured for optimal physiological and psychological effects and benefits for one or more applications, and then may be readily reconfigured without changes to physical structures for diverse applications having different requirements for optimal physiological and/or psychological effects and benefits. Rather than waiting for a time delay as is the case with motion detectors, the optical XCVRs (and in some embodiments the optical XCVRs in conjunction with software) in the lighting fixture recognize immediately that the person has moved beyond a particular light, allowing that particular light to be dimmed or turned off. Also, this smart technology may be used to turn lights on only for people with the correct code embedded in their name tag. In such an embodiment, the user can walk into a restricted area, and if not authorized to be there, the lights would remain off, and if authorized the lights would turn on. Alternatively, a teacher with a name tag grading papers in a classroom, for example, may use the name tag to turn only the lighting near the teacher's desk at full brightness, while other lighting in the room remains at a dimmer, more energy efficient, setting.

Energy management is not solely limited to total power consumption. Peak inrush current is also an important factor monitored by many utility companies. This is the peak power draw of the power customer, for exemplary purposes within each twenty-four hour period. By controlling the timing of illumination and other equipment start-up, electrical draw may be gradually ramped up. Many devices initially draw more power at start-up than when operational. So, since each light is individually addressed and controlled and appliances or machines may similarly be controlled, the communications afforded by the present invention permit much smaller banks of devices to be started, allowing those devices to surge and then settle to lower energy requirements before starting the next bank of devices. Some devices and machines very quickly drop down to lower power draw. LED light sources are such a device. Banks of these may very quickly and sequentially be started. Other devices, such as electrical compressors found in heat pumps, refrigeration and air conditioning units, may require much more time for start-up, before additional devices should be started. Likewise, the particular order of start-up may be optimized for the various electrical loads found within a building. All of this is readily accomplished through simple programming and communication through preferred LED light sources or equivalents thereto.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical or electrically controllable devices.

In some embodiments, the name tag may be used to assist emergency personnel. For example, if a person with a name tag had an incapacitating emergency condition while walking along a hallway in a building with optical XCVRs, as in the embodiments described above, the hallway lighting can be modified to direct emergency workers directly to the injured person. The lights can be made to flash, change color, or form directional arrows, or sequential directional indicators, or otherwise signify to the emergency personnel the quickest path to the person.

In at least one embodiment of the present invention, the optical XCVR may be incorporated into a clock, preferably on the face of the clock, as seen in FIGS. 1-10. The AC electrical wiring of a building (e.g. school, office, etc.) is used to provide BOPL access to the building. The building includes a master clock 220 and one or more clocks 222 located throughout the building, each clock powered by the AC electrical wiring 224, as seen in FIG. 5. In some embodiments, the master clock 220 and the other clocks 222 are on the same electrical circuit. The master clock may include a number of functions, including an annunciator panel. The annunciator panel may be used to communicate fire alarms, tornado alarms, lockdowns, presence of an unknown person(s), etc. to annunciator panels on the other clocks. The master clock is in operative communication with a power line bridge 150. The master clock includes appropriate circuitry for encoding the alarm signals and transmitting them to the power line bridge onto the AC electrical wiring. The packets are then routed to clocks located in other rooms in the building to communicate the alarm signal.

The other clocks include power line bridge circuitry for decoding the signal and a display and/or speaker for communicating the transmitted alarm. As seen in FIG. 2, the clocks 222 further include one or more optical XCVRs 160 that allow communication between other devices in a room that are equipped with optical XCVRs, such as thermostats 226, smoke detectors 228, cameras 230, and PA speaker 232, as seen in FIG. 4. The optical XCVRs in the clock also allow communication with other rooms and/or a central location. For example, upon sensing smoke, a smoke detector equipped with an optical XCVR broadcasts the signal, which is in turn received by the clock's optical XCVR and transmitted over the AC wiring to a central location as an alarm.

Energy management may also be accomplished by using the optical XCVR on the clock to turn down/up a thermostat equipped with an optical XCVR, based on the time of day, or whether anyone is in the room. In such an embodiment, students, for example, may each wear one of the above-described name tags that broadcast a unique code. If the optical XCVR in the clock in the room is polling and does not detect any unique codes being broadcast in the room, it sends the information along to a central location that, in turn, instructs the optical XCVR in the clock to broadcast a signal to turn the thermostat up/down to save energy. A similar function may be performed with respect to the lighting in the room. As described in detail above, the BOPL and optical XCVRs may be used to provide Internet access, thereby allowing the optical XCVR on the clock to be the access point for the Internet connection. If a PA speaker is included in the clock, or is in communication with the clock as in FIG. 4, the optical XCVR of the clock may also be used as a public address system to broadcast messages.

In some embodiments, the clock face is an analog display, as seen in FIG. 2. However, in at least one embodiment, the clock is a digital clock, as seen in FIG. 3. In some embodiments, the LED segments 234 act both as the display of the clock and as the LEDs used for transmitting data signals. The digital clock further includes one or more photodiodes 126 for receiving data signals.

In at least one embodiment of the present invention, each student in a school wears a name tag with an optical XCVR. The optical XCVR on a name tag may communicate with the optical XCVR on a clock to indicate whether a student in a classroom is present, or provide the student's location. In a normal classroom setting multiple students will be present. Thus, a channel access method can be provided to allow all students and teachers to use the clock's optical XCVR.

In some embodiments, a channel access method like time division multiple access (TDMA) may be used. TDMA splits a signal into timeslots, with each user transmitting only in their allotted time slot. One of ordinary skill will recognize that frequency division multiple access (FDMA), code division multiple access (CDMA), or other channel access method may be used to allow multiple optical XCVRs to transmit to a single optical XCVR.

In some embodiments, the optical XCVR associated with the clock, for example, is constructed and arranged such that each photodiode acts as a separate receiver channel. The multi-channel optical XCVR on the clock may be used for parallel processing of received data, for example 30 students with unique name tags transmitting simultaneously. In such an embodiment, it may not be necessary to use channel access methods because the optical XCVR is designed with sufficient channel capacity to handle all incoming traffic. In some embodiments, the processor of the optical XCVR may simultaneously process all incoming signals. In embodiments where the processor cannot simultaneously process all incoming signals, it may be desirable to include buffers to buffer the incoming signals so that signals are processed according to the time they were received.

In at least one embodiment, the optical XCVR associated with the clock, for example, is constructed and arranged such that each LED acts as a separate transmission channel. The multi-channel optical XCVR on the clock may be used for parallel transmission of data, for example. That is, each LED in the LED array of the optical XCVR may be used to broadcast a different data stream. So, $LED_1$ could broadcast a data stream to computer 1, and $LED_2$ could simultaneously broadcast a different data stream to computer 2, and $LED_3$ could simultaneously broadcast a different data stream to computer 3, etc. It should be noted that the optical XCVR in a clock is an exemplary embodiment. One of ordinary skill will recognize that a multi-channel optical XCVR may be embodied in numerous other devices, or as a standalone device.

As stated above, the LEDs may be bi-directional. In at least one embodiment, the optical XCVR is comprised of bi-directional LEDs. In such an embodiment, the optical XCVR is constructed and arranged such that at least one of the bi-directional LEDs allows parallel transmitting and receiving of light signals.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc.

As described herein each, optical XCVR may also include non-volatile memory (FLASHRAM, EEPROM, and EPROM, for example) that may store firmware for the optical XCVR, as well as text information, audio signals, video signals, contact information for other users, etc., as is common with current cell phones.

In some embodiments, an optical signal amplifier is in communication with the photodiodes to increase the signal strength of the received light signals. In at least one embodiment, the LEDs are in operative communication with an LED power driver, ensuring a constant current source for the LEDs.

In some embodiments, the XCVRs may include circuitry that performs modulation, demodulation, data compression, data decompression, up converting, down converting, coding, interleaving, pulse shaping, and other communication and signal processing techniques, as are known by those of ordinary skill in the art.

An embodiment of a slave clock 3107 combined with optical transmitter 3102 and optical detector 3103 is illustrated in FIG. 6. Optical transmitter 3102 preferably comprises at least one optical LED, and most preferably comprises an RGB LED, designating that the LED includes Red, Green, and Blue which are the primary additive colors from which all other colors including white may be produced. For exemplary purposes only, optical transmitter 3102 may comprise discrete LEDs of each primary color, or may alternatively be a single RGB LED integrated onto a common die, taking the physical form of a single LED. Furthermore, more than one RGB LED may be integrated upon a single die or within a common package or optical transmitter 3102, as may be deemed most appropriate. In practice, there is no limit to the number of RGB LEDs that may be used, other than physical size and available space limitations, and thermal dissipation capacity and power requirement constraints.

By controlling the relative power applied to each one of the RGB LEDs, different colors may be produced. This concept is well-known as the RGB model, and is used today in nearly all video displays. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors. The display of different colors can be used as a part of a visual signaling system, using particular colors as indicators of particular information. As one example, though not limiting the present invention in any way, a flashing red optical transmitter 3102 might signal a fire drill, while a steady red optical transmitter 3102 might signal an actual fire. Any type of condition, such as a tornado, fire, lockdown, or movement may be signaled. With an RGB LED, all colors may be used and steady versus flashing illumination may be further combined, making the distinguishable set of optical indicators available to a system designer very large.

While other options exist for producing white light from LEDs, the use of an RGB LED absent of phosphors is preferred for most applications of the present invention. Not only is color of the light easily controlled using well-known RGB technology, but also by their very nature phosphors tend to slow down the rate at which an LED may be illuminated and extinguished due to phosphor latencies. For the purposes of the present invention, where an optical communications channel is created using optical transmitter 3102, higher data transfer rates may be obtained with more rapid control of illumination levels. Consequently, if phosphors are used in the generation and/or conversion of light, and if faster data exchange rates through optical communications are desired, these phosphors will preferably be very fast lighting and extinguishing.

Optical detector 3103 may either be a broad spectrum detector or alternatively color-filtered or sensitive to only a single color. Detector 3103 will be any of the many known in the art, the particular selection which will be determined by well-known considerations such as sensitivity, reliability, availability, cost and other considerations.

FIG. 7 illustrates a second embodiment slave clock 3107' combined with optical receiver 3103 and a different optical transmitter 3104. Where an LED slave clock exists, one or more of the LED segments has the capability of serving as an optical transmitter 3104. In this embodiment, more segments are available, but in most cases these LED segments will emit only a single color, eliminating the ability to use colors as a part of visible signaling. Flashing may, however, still be used.

FIG. 8 illustrates by projected environmental view an embodiment of a communications network incorporating master and slave synchronized clocks. In accord with a preferred method of the invention, optical transmitter LEDs 3102, 3104 are used to transmit one or more kinds of data, including identity, location, audio and video information, and various data signals. The data signals may arise through communications within a Local Area Network (LAN), sometimes referred to as an Intranet, owing to the common use of such a network entirely within an office space, building, or business. The data may additionally or alternatively arise through communication with a Wide Area Network (WAN), commonly describing a network coupling widely separated physical locations which are connected together through any suitable connection, including for exemplary purposes but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The data may further arise through communications with the Internet.

The data is introduced at a junction between master clock 3105 and slave clocks 3107 using a Broadband-over-Power-Line (BPL) transceiver 3106. (FIG. 9) BPL transceiver 3106 may use circuitry already known in the art, but may also further comprise a detector and control which disables data transfer during ordinary clock synchronization.

The use of an optical communications link provides large available bandwidth, which in turn permits multiple feeds of personal communication between slave clocks 3107 and other light communications enabled devices. Optical data is transferred at rates far in excess of those detectable by the human eye, and so in many cases a person may not be able to detect any visible changes as the data is being transferred. Additionally, a plurality of LEDs may be incorporated into an array, and may be used for a plurality of communications channels. In this case, the likelihood of the plurality all going dark, resulting in visible differences in room illumination is reduced. Software may further be incorporated to monitor and predict illumination, and control data transmissions from one or more streams accordingly to maintain desired illumination levels. In another embodiment, some of the plurality of LEDs may be maintained in an on state, while others of the array may be used for data transmission. In these cases, the minimum possible illumination is that of the on-state LEDs.

As may be appreciated, a number of approaches are available or will be apparent from the foregoing discussion to maintain baseline illumination.

Because optical illumination is constrained by opaque objects such as walls, the location of an associated device or person can be discerned to a particular room, hallway or other similar space. In contrast, prior art GPS systems and cell phone triangulation techniques are typically only accurate to one or several hundred feet. Horizontally, this prior art precision is adequate for many applications. However, vertically several hundred feet could encompass twenty floors in an office or apartment building. The preferred embodiment, capable of precision to a room or light fixture, therefore has much more exact pinpointing than hitherto available. It can locate a person immediately, even in a large area and/or among a large crowd, and can keep track of a large population simultaneously. The large bandwidth permits video signals to be integrated, providing the opportunity to create audio-video records that are fixed in time and location.

Since location may be relatively precisely discerned, optical transmitter LEDs 3102, 3104 may in one embodiment be configured to change color, flash, or otherwise be visually changed or manipulated to assist with directional guidance, personnel or intruder identification, energy management, or even to facilitate the meeting and connection of individuals.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical, electro-mechanical or electrically controllable devices.

In the event of an unauthorized presence, and in accord with another embodiment of the invention, the present preferred apparatus may be used for detection and location. When a building is dark, in many cases an unauthorized person will rely upon a flashlight to move through the building. Most preferably, optical detector 3103 will detect this unidentified light source. In such case, since the location of optical detector 3103 is known precisely, the location of the unauthorized person is also known. Further, even as the unauthorized person moves about, so the unauthorized person will be tracked by virtue of the light emitting from the unauthorized person's flashlight. When emergency personnel are called to the building, LED optical transmitters 3102, 3104 may be used to guide the emergency personnel to the exact location of the unauthorized person. The emergency personnel may not be limited to police. As may by now be apparent, ambulance workers as well as police would appreciate flashing directional lights because quicker access to an emergency scene could potentially save lives. This custom guidance system can include red, white or other suitably colored or illuminated lights which may be steady or flashing for emergency situations.

FIG. 8 illustrates by front environmental view an embodiment of a building communication and management system within one room or space 3020, using a single slave clock 3107 to communicate with a variety of diverse devices through optical LED communication channels. In practice, in a schoolroom or other public building this clock 3107 could communicate with other light communication enabled devices. For exemplary purposes only, and not limiting thereto, other light communication enabled devices might include: public address system 3108; another clock 3107; a thermostat 3109; fire and smoke alarms 3110 and 3111; or a camera 3112. Since these devices are light communication enabled, they may be controlled and/or monitored. Thus information from any enabled device can be shared with all other devices on the same network as the clock. Slave clock 3107 communication can further be shared with optically-enabled name tags, telephones, TV and music, Internet, public address, computing devices of all sorts, ranging from hand-held devices such as Personal Digital Assistants (PDAs) to massive mainframe computers, and including Personal Computers (PCs), printers, network storage devices, other security and safety devices, appliances, HVAC systems, manufacturing machinery, and so forth. Essentially, any device which incorporates or can be made to incorporate sufficient electronic circuitry may communicate with slave clock 3107 to exchange information at any time.

A building's security may further be enhanced through the use of name tags, which a slave clock 3107 can read and communicate with. The appropriate command signaled from LED optical transmitters 3102, 3104 may additionally control door locks. Camera 3112 can broadcast video through the optical link, and anything on the clock network can receive the picture. This would be most useful for recording or broadcast.

Many different conditions or devices may be simultaneously monitored and/or controlled when they are broadcasting information through the preferred clock network, because they are operating on a wide-bandwidth optical link. This information can be used anywhere on the clock network, which includes the other rooms or a central server. Bandwidth may be limited by existing clock synchronization wiring, but should still be able to provide enough to additionally incorporate video signals from at least one user, such as a teacher in a classroom. Furthermore, where desired and suitably enabled, all types of data or information may be carried through the preferred communications systems illustrated in the Figures, including but not limited to telephone signals, television signals, Internet connections, building maintenance wiring such as thermostats, fire alarms, motion detectors, and any other electrical or electronic apparatus existing or appearing within the room or space. Thus, a building need to be wired only for power and synchronized clocks, saving a huge infrastructure of other wires and fixtures and in turn saving a great deal of money.

While bandwidth may be relatively limited in the case of open synchronization wiring interspersed with other wires or adjacent to other sources of EMI/RFI, several additional circumstances may pre-exist or may be provided to boost the bandwidth of a system designed in accord with the present invention. In one embodiment, all or many synchronization wires are shielded within a conduit or other suitable shielding, most preferably for the entire distance between BPS transceiver 106 and each slave clock 3107. Such shielding results in the preferred S-BPL communications channel, which is anticipated to have higher bandwidth capability than provided with open and unshielded wires.

Relatively recently, artisans have also proposed using so-called E-lines for extremely high bandwidth, low attenuation transmission. Such transmission schemes are, for exemplary purposes, proposed in U.S. Pat. Nos. 6,104,107 and 7,009,471, the contents of each which are incorporated by reference for their teachings of high-speed transmissions over single conductors. While the present invention is fully operational using known or well-established transmission techniques and resulting bandwidths, and so is completely independent of the whether these E-line transmission techniques work and are applicable or not to the present invention, the present invention further contemplates improvements to bandwidth using useful and functional transmission techniques and the incorporation of the same where operationally suitable.

The usefulness of embodiments of the present invention is illustrated, for example, by smoke alarm 3110. Since it is optically enabled, it can broadcast to slave clock 3107 the existence of a fire. The location of slave clock 3107 will preferably be stored, so the location and existence are both immediately known. Since the whole network is aware of the site of the fire, the nearest personnel can implement evacuation plans. Likewise, public address system 3108 can immediately direct traffic in the event of an emergency.

Camera 3112 provides video feed of the activity in a given room, thus enhancing security. If audio and/or video is enabled, through one or more personal communications badges or separate wall-mounted cameras 3112, the video can be used to capture the last-known conditions of a user or an area. This can be important in the event a disaster strikes that results in significant destruction of property or life.

Monitoring of thermostat 3109 by the network allows the temperature of a room to be controlled according to various factors such as outdoor temperature, building temperature, and the number of occupants.

Thus communication, security, and energy/building management are vastly improved through the clock with optical transmitter and receiver.

Figure 10:
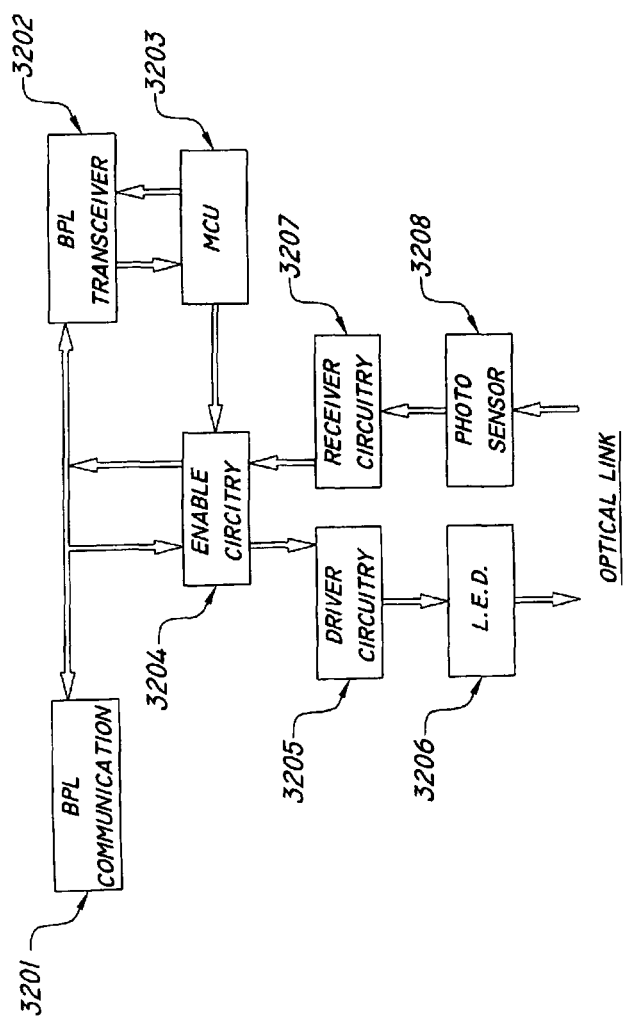
FIG. 10 illustrates by block diagram an electrical schematic of a communications network incorporating master and slave synchronized clocks such as illustrated by FIG. 8, but with only one slave clock illustrated therein.

FIG. 10 illustrates by block diagram an electrical schematic of a communications network incorporating master and slave synchronized clocks such as illustrated by FIG. 8, but with only one slave clock illustrated therein. Incoming/Outgoing BPL communication 3201 is provided through a clock synchronization wire, as shown in FIG. 9, from BPL transceiver 3106. This is the shared electrical circuit.

A BPL transceiver 3202 is provided at clock 3107 to receive and transmit data from/to the BPL enabled electrical circuit shared by the slave clocks. The particular interface implemented may vary. Currently a number of existing interfaces could be used, such as Universal Serial Bus (USB), Ethernet, Media Independent Interface (MII), etc, and the particular choice of interface could further depend on the BPL transceiver used, as will be apparent to those skilled in the art.

A micro-controller, microprocessor, ASIC or the like 3203 is provided for program control that can transmit/receive data to/from BPL communication network 3201 through BPL transceiver 3202. Microprocessor 3203 in an embodiment may respond to commands received on this network 3201 to manipulate enable circuitry 3204, and may also issue commands or send data to network 3201 if needed. If the transmit portion of enable circuitry 3204 is enabled, these commands/data will also be passed to the optical link.

Enable circuitry 3204, through driver circuitry 3205, may in one embodiment be enabled to turn on or off the LED optical transmitters 3102, 3104, as well as change the characteristics of the light, such as brightness and even color mix when multicolor LEDs are used. This is useful for things such as an annunciator light or emergency light, which may provide a visual indicator for things such as tornado, lockdown, fire, movement, etc. Enable circuitry 3204 may also manipulate the ability for BPL communication network 3201 to send and/or receive data at this clock to or from the optical link.

Driver circuitry 3205 and LED(s) 3206 will pass any signals to the optical link for other devices designed to communicate with clock 3107. Driver circuitry 3205 may, in the preferred embodiment, simply be appropriate buffering, isolation, modulation or amplification circuitry which will provide appropriate voltage and power to adequately drive LED emitter 3206 into producing a visible light transmission. Exemplary of common driver circuits are operational amplifiers (Op-amps) and transistor amplifiers, though those skilled in the art of signal conditioning will recognize many optional circuits and components which might optionally be used in conjunction with the present invention. Also, it may be desirable to use a modulation scheme with the signal. The transmit circuitry may have to provide a means of modulation in this case, also preferably incorporated into driver circuitry 3205. The type of modulation will be decided using known considerations at the time of design, selected for exemplary purposes from FM, AM, PPM, PDM, PWM, OFDM, and QAM.

Similar to but preferably complementary with the transmission circuitry, receiver circuitry 3207 receives data from the optical link detected by photo sensor 3208. Receiver circuitry 3207 will appropriately condition, and may further convert a data-bearing electrical signal. As but one example of such conversion, receiver circuitry 3207 may additionally demodulate a data-bearing electrical signal, if the data stream has been modulated by an optical host. Suitable buffering, amplification and other conditioning may be provided to yield a received data signal.

In one embodiment, LED 3206 may be illuminated as a night light at low power. Where properly enabled with battery back-up or the like, the preferred embodiment communications such as illustrated in the Figures may further provide communications and emergency lighting in the event of a power failure.

In an embodiment of the invention, an intelligent audio/visual observation and identification database system may also be coupled to sensors as disposed about a building, relying upon the present communications system transmitting over the synchronization wire of a clock system. The system may then build a database with respect to temperature sensors within specific locations, pressure sensors, motion detectors, communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the pre-stored or learned data to identify discrepancies therebetween. In addition, filtering, flagging and threshold procedures may be implemented to indicate a threshold discrepancy to signal an officer to initiate an investigation. The reassignment of priorities and the storage and recognition of the assigned priorities occurs at the computer to automatically recalibrate the assignment of points or flags for further comparison to a profile prior to the triggering of a signal representative of a threshold discrepancy.

The intelligent audio/visual observation and identification database system may also be coupled to various infrared or ultraviolet sensors, in addition to the optical sensors incorporated directly into LED optical transmitters 3102, 3104 and optical detectors 3103, and used for security/surveillance within a structure to assist in the early identification of an unauthorized individual within a security zone or the presence of an intruder without knowledge of the intruder.

The intelligent audio/visual observation and identification database system as coupled to sensors and/or building control systems for a building which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

The optical link does not interfere with existing communication systems like those that are common today. Consequently, the preferred embodiment may be used in a variety of applications where prior art systems were simply unable due to EMI/RFI considerations.

Set-up, testing, troubleshooting and the like are also vastly simplified. When the light communication system is working, the user can actually see the illumination. If an object interferes with light transmission, the user will again immediately recognize the same. Thus, the ease and convenience of this light system adds up to greater mobility and less cost. In addition, relatively high energy outputs may be provided where desired using the preferred visible light communications channel, since the human eye is adapted and well-protected against damage from light. In contrast, many invisible transmission techniques such as Ultraviolet (UV) or Infra-Red (IR) systems have much potential for harm.

A host lamp fixture system may replace stationary (mounted in a particular place) lighting fixtures in order to communicate data. Inside of LED lights there may be one or many dies; these may pulsate on slightly different frequencies from a single light to communicate. Each may be looking for changes by way of Multiple Channel Access or other suitable technique.

The variable and/or pulsed light signals may be alternatively described as the systematic information transfer through encrypted/pulsed light or acronym SIT-TEL. Any number of pulsed light signals having the same or different durations may be grouped into a signal packet. Each packet or combination of signals may be assigned a character, number, or other information as data within a memory which may be integral to a controller. Individual packets of grouped pulsed LED SIT-TEL light signals may be combined into a message, word, and/or character for processing and/or translation by a second controller for communication of information to an individual.

Any number of relay sites may be sequentially positioned between the communication system and the user site. Each SIT-TEL communication signal may therefore be passed from the first LED light sources to a second receiver integral to an initial relay site for successive transmission to additional second receivers of relay sites for final SIT-TEL transmission to a third receptor integral to a user site. SIT-TEL communication signals may therefore be processed sequentially through successive relay sites to a user site.

In this regard, each intermediate relay site and user site, is required to have a stored identification combination of pulsed LED light signals to identify an address. The addresses for each and every site and/or user site, are stored within each respective second controller and third controller respectively.

LVXR is the acronym for light visually transmitted repeater. This device will be used as a light signal repeater similar to that in radio repeater towers. A signal is received, processed for accuracy, routing, etc., and then rebroadcast/rerouted to the next device. Visual light will go into the LVXR device as packets, be compared until there are at least two identical and then sent out in the next step closer for proper routing direction. Each device will receive packeted data via visual light form, along with other possible augmented communication mediums, process the data packet then pass the information to the next LVXR. That in turn will do the same thing, setting up an optical communication from one location to another for the rebroadcasting of visual light signals from one visual light transceiver to another for the purpose of creating an optical data communication link over an appreciable, practical distance with accessibility along either all or part of the distance using visual light transmitting/receiving apparatus.

Data may be sent from one location to another using GPS as the data packet addressing information, hence connecting the data packet routing information to a geographic location instead of a cyber location. This would mean that a data packet would not have to be translated into a geographic location in order to find the transmission/receiving source. Each packet will be assigned a GPS location for its routing origin and destination. To find the origin or destination of a cyber addressed packet of information will require translating the cyber address into a physical address. Each data packet is in real life and real time. Each packet will be assigned and contain a "GPS" origin/destination address as it passes through the network infrastructure; it will always be looking for the next closest GPS address location. Each static LVXR transceiver, and some dynamic, within the network will be designated with a GPS location number. As data packets pass through the system, they are routed by the transceivers, with their internal processors, to the next physical closer LVXR within the network. If another LVXR is within range of receiving or is connected with another form of communication medium, it receives the data packet. The LVXRs' internal processor compares its internal location address ("ILA" Internal Location Address) to the data packet's destination address and the last known LVXR's ILA stored within the address code ("LTA" Last LVXR Transmission Address). If the comparing LVXR's ILA code is closer to the data packet destination address then the last LVXR's LTA code stored within the data packet address code, it then inserts its ILA code into the data packet address code as the new LTA code and then repeats the entire data packet with the updated LTA code. It does this until it reaches the destination LVXR where it is transmitted on location at the destination addressed on the data packet, the GPS position, the LVXR with that ILA or the that LVXR with the closest ILA to the origin GPS address. If a piece of the infrastructure is missing, it will reroute itself to the next nearest and continue until it finds its way through the network.

This means each user of the system can declare one or more static positions and have a dynamic position at any time. The system will track the user as he passes LVXRs, similar to that of cell phones in relation to their towers. Each user of the system can determine at any point what his static address is. A static address can be your office, your bedroom, your home, wherever it makes practical sense. When a user leaves his static address to traverse through the infrastructure, he then becomes dynamic. If a packet of data comes to his static address, it will then be informed as to where his dynamic address is by using similar schemes as that of cell phones.

In addition to being directed to the embodiments described above and claimed below, the present invention is further directed to embodiments having different combinations of the features described above and claimed below. As such, the invention is also directed to other embodiments having any other possible combination of the dependent features claimed below.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

We claim:

1. In combination, an LED light and communication system in communication with a broadband over power line communications system, comprising:
a plurality of optical transceivers disposed throughout a facility each of said optical transceivers comprising a processor, a plurality of light emitting diodes, and at least one photodetector, said plurality of light emitting diodes generating light as illumination, said processor being in communication with said plurality of light emitting diodes and said at least one photodetector, said processor being constructed and arranged for transmission of at least one transmitted communication signal and said at least one photodetector being constructed and arranged for receipt of at least one received communication signal, said at least one transmitted communication signal being embedded within said illumination and said at least one received communication signal being embedded within said illumination, each of said at least one transmitted communication signal and said at least one received communication signal comprising a plurality of rapid flashes of light, said rapid flashes of light not observable to an individual, wherein said rapid flashes of light are configured for transmission of information or data, said at least one optical transceiver further comprising at least one internal optical transceiver location identifier, said at least one transmitted communication signal comprising said at least one internal optical transceiver location identifier, said at least one received communication signal comprising at least one last transmission optical transceiver location identifier and at least one destination optical transceiver location identifier, said processor being further constructed and arranged to compare said at least one destination optical transceiver location identifier to said at least one internal optical transceiver location identifier and to re-transmit said at least one received communication signal as said at least one transmitted communication signal when said at least one destination optical transceiver location identifier is not identical to said at least one internal optical transceiver location identifier, said processor being further constructed and arranged to replace said at least one last transmission optical transceiver location identifier with said at least one internal optical transceiver location identifier in said at least one received communication signal as said at least one last transmission optical transceiver location identifier at least one internal optical transceiver location identifier, said at least one last transmission optical transceiver location identifier, and said at least one destination optical transceiver location identifier comprising global positioning system location information, wherein at least one of said at least one optical transceivers is engaged to and is in communication with an electronic device, said electronic device being in communication with a broadband over power line communications system, said electronic device being further constructed and arranged to receive at least one broadband over power line communication signal from the broadband over power line communication system and to communicate said at least one broadband over power line communication signal to said at least one optical transceiver.

2. The combination of claim 1, further comprising an amplifier constructed and arranged to amplify said at least one transmitted communication signal, said combination further comprising at least one of level shifting circuitry, modulation circuitry, phase-shifting keying, amplitude-shifting keying, frequency-shifting keying and quadrature modulation.

3. The combination of claim 1, further comprising an intelligent audio/visual observation and identification database system in communication with said combination of said LED light and communication system and said broadband over power line communication system.

4. The combination of claim 2, wherein the at least one optical transceiver is constructed and arranged to communicate with a name tag.

5. The combination of claim 4, wherein the name tag comprises at least one optical transceiver.

6. The combination of claim 5, wherein the name tag includes a unique name tag identifier.

7. The combination of claim 6, wherein said processor is constructed and arranged to identify the location of said name tag relative to at least one of said at least one optical transceivers.

8. The combination of claim 7, wherein said processor is constructed and arranged to alter the status of at least one of illumination lights and door locks following positioning of said name tag relative to at least one of said optical transceivers.

9. The combination of claim 1, wherein the at least one optical transceiver is constructed and arranged to communicate with a thermostat.

10. The combination of claim 1, wherein the at least one optical transceiver is constructed and arranged to communicate with a video camera.

11. The combination of claim 1, wherein the at least one optical transceiver is constructed and arranged to communicate with a public address system.

12. The combination of claim 1, wherein the at least one optical transceiver is constructed and arranged to communicate with a smoke detector.

13. The combination of claim 1, wherein said processor is constructed and arranged to receive said at least one broadband over power line communication signal and to include said at least one broadband over power line communication signal into at least a portion of said at least one transmitted communication signal.

14. The combination of claim 1, said at least one transmitted communication signal and said at least one received communication signal each comprising at least one data packet.

15. The combination of claim 1, at least one of said plurality of optical transceivers further comprising at least one of a camera, a microphone, and a speaker.

* * * * *